United States Patent [19]

Tamura et al.

[11] Patent Number: 4,987,308
[45] Date of Patent: Jan. 22, 1991

[54] CASSETTE FOR STIMULABLE PHOSPHOR SHEET

[75] Inventors: Kaoru Tamura; Shumpeita Torii, both of Kanagawa, Japan

[73] Assignee: Fuji Photo Film Co., Ltd., Kanagawa, Japan

[21] Appl. No.: 336,520

[22] Filed: Apr. 11, 1989

Related U.S. Application Data

[63] Continuation of Ser. No. 572,050, Jan. 19, 1984, abandoned.

[30] Foreign Application Priority Data

Jan. 21, 1983 [JP] Japan ................................. 58-8360

[51] Int. Cl.$^5$ ............................................. G01T 1/105
[52] U.S. Cl. ............................. 250/484.1; 250/327.2; 378/187
[58] Field of Search ................... 250/327.2, 484.1; 378/165, 166, 187, 188

[56] References Cited

U.S. PATENT DOCUMENTS

| | | |
|---|---|---|
| 3,153,145 | 9/1961 | Yerkovich ........................ 378/187 |
| 3,511,990 | 5/1970 | Hauss ............................... 378/187 |
| 3,859,527 | 1/1975 | Luckey ........................... 250/327.2 |
| 4,166,958 | 9/1979 | Haselbarth ...................... 378/188 |
| 4,236,078 | 11/1980 | Kotera et al. ................. 250/363 R |
| 4,239,968 | 12/1980 | Kotera et al. ................. 250/327.2 |
| 4,258,264 | 3/1981 | Kotera et al. ................. 250/484.1 |
| 4,261,854 | 4/1981 | Kotera et al. ................ 252/301.4 H |
| 4,320,296 | 3/1982 | Ishida et al. .................. 250/327.2 |
| 4,498,005 | 2/1985 | Oono et al. .................... 250/327.2 |
| 4,510,388 | 4/1985 | Yamazaki et al. ............. 250/327.2 |
| 4,512,911 | 4/1985 | Kotera et al. ................ 252/301.4 H |
| 4,521,904 | 6/1985 | Takano ............................ 250/484.1 |
| 4,578,582 | 3/1986 | Takano ............................ 250/327.2 |
| 4,681,227 | 7/1987 | Tamura et al. ...................... 206/455 |
| 4,889,996 | 12/1989 | Kotera et al. ................. 250/484.1 |

FOREIGN PATENT DOCUMENTS

| | | | |
|---|---|---|---|
| 0077676 | 4/1983 | European Pat. Off. ......... 250/327.2 |
| 0108982 | 5/1984 | European Pat. Off. ......... 250/484.1 |
| 56-11395 | 2/1981 | Japan ............................... 250/327.2 |
| 1099069 | 1/1968 | United Kingdom ................ 271/190 |

Primary Examiner—Constantine Hannaher
Attorney, Agent, or Firm—Sughrue, Mion, Zinn, Macpeak & Seas

[57] ABSTRACT

A cassette for removably housing a stimulable phosphor sheet for storing a radiation image therein comprises a flat box-like front plate and a cover member openably coupled with the front plate. A foamed material is secured to the inner surface of the front plate, thereby preventing the stimulable phosphor sheet from being scratched when the sheet is taken out of or inserted into the cassette. The foamed material has at least one notch for exposing a part of the inner surface of the front plate, so that the stimulable phosphor sheet housed in the cassette does not come in contact with the foamed material at the portion of the notch and can be readily separated from the foamed material when the stimulable phosphor sheet is taken out of the cassette.

5 Claims, 2 Drawing Sheets

CASSETTE FOR STIMULABLE PHOSPHOR SHEET

This is a continuation of application Ser. No. 06/572,050, filed 1/19/84, now abandoned.

BACKGROUND OF THE INVENTION

1. Field of the Invention

This invention relates to a cassette for housing a stimulable phosphor sheet.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, the phosphor emits light having intensity in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in the pattern of the stored image. The light emitted from the stimulable phosphor sheet upon stimulation thereof is photoelectrically detected and converted to an electric image signal, which is processed as desired to reproduce a visible image on a recording medium such as a photographic material or on a display device such as a cathode ray tube (CRT).

This radiation image recording and reproducing system using the stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the phosphor varies over a very wide range in proportion to the amount of energy stored therein, it is possible to obtain an image having desired density regardless of the amount of exposure of the phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

The stimulable phosphor sheets used in the aforesaid radiation image recording and reproducing system are handled in the form housed in a cassette for containing a single stimulable phosphor sheet or in a magazine for containing many stimulable phosphor sheets. After radiation images are stored in the stimulable phosphor sheets, the cassettes or the magazine containing the stimulable phosphor sheets carrying the radiation images stored therein is loaded into a sheet feeding apparatus, i.e. a cassette feeder or a magazine feeder, from which the stimulable phosphor sheets are fed one by one to a radiation image read-out apparatus.

The aforesaid cassette used to house a single stimulable phosphor sheet is formed in the same manner as the conventional X-ray film cassette. That is, the cassette comprises a flat box-like front plate and a cover member for covering the front plate. The stimulable phosphor sheet is housed in the cassette so that the stimulable phosphor layer side of the stimulable phosphor sheet stands face to face with the inner surface of the front plate. Recording of a radiation image by use of a radiation such as X-rays is conducted by positioning the cassette housing the stimulable phosphor sheet as described above at a point exposed to the radiation emitted from a radiation source and passing through an object.

As described above, recording of a radiation image in the stimulable phosphor sheet is conducted by using the sheet in the form housed in the cassette. However, read-out of the radiation image stored in the sheet is conducted by taking the sheet out of the cassette and scanning the sheet with stimulating rays.

In the radiation image read-out step, since the stimulable phosphor sheet is taken out of the cassette, the stimulable phosphor layer of the sheet housed in the conventional cassette is readily scratched by the inner surface of the front plate of the cassette when the sheet is taken out of the cassette. Further, the stimulable phosphor layer of the sheet is readily scratched by the inner surface of the front plate of the cassette also when the sheet is inserted into the cassette.

Also, in the conventional cassette, the stimulable phosphor sheet is closely contacted with the inner surface of the front plate of the cassette. Therefore, the removal of the sheet from the cassette by use of a vacuum attraction type suction arm or the like sometimes fails, and not infrequently the sheet is taken out of the cassette in an incorrect sheet position.

SUMMARY OF THE INVENTION

The primary object of the present invention is to provide a cassette for a stimulable phosphor sheet, which prevents the sheet from being scratched when the sheet is taken out of the cassette.

Another object of the present invention is to provide a cassette for a stimulable phosphor sheet, which prevents the sheet from being scratched also when the sheet is inserted into the cassette, thereby prolonging the life of the sheet.

The specific object of the present invention is to provide a cassette for a stimulable phosphor sheet, which is constructed so that the sheet ca be easily taken out of the cassette.

The cassette for a stimulable phosphor sheet in accordance with the present invention is characterized by the provision of a foamed material such as a polyethylene foamed material, which is secured to the inner surface of a front plate of the cassette and which has at least one notch for exposing a part of the inner surface of the front plate.

The foamed material as described above is very soft and does not scratch the stimulable phosphor layer of the stimulable phosphor sheet even when the foamed material comes in contact with the stimulable phosphor layer. Therefore, the life of the sheet is prolonged. Further, since the foamed material secured to the inner surface of the front plate of the cassette is provided with at least one notch, the sheet housed in the cassette is not closely contacted with the foamed material at the portion of the notch thereof, but instead air intervenes between the sheet and the inner surface of the front plate of the cassette at the portion of the notch of the foamed material. Therefore, the sheet can be easily separated from the inner surface of the front plate of the cassette and taken out of the cassette. This means that no sheet taking-out failure arises, and the efficiency of image read-out operations is improved. Also, since the foamed material exhibits a very high transmittance to X-rays, it does not adversely affect the amount of X-rays to which the stimulable phosphor layer of the sheet is exposed, nor is the notch portion of the foamed material recorded as an image in the stimulable phosphor layer of the sheet.

DESCRIPTION OF THE PREFERRED EMBODIMENTS

The present invention will hereinbelow be described in further detail with reference to the accompanying drawings.

Figure 1:
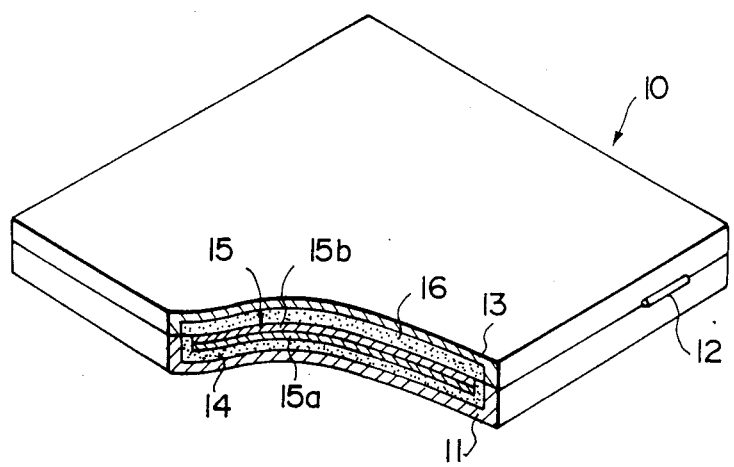
FIG. 1 is a partially cutaway perspective view showing a embodiment of the cassette in accordance with the present invention.

Referring to FIG. 1, a cassette 10 comprises a flat box-like front plate 11 and a cover member 13 mounted on the front plate 11 by a hinge 12 for openably covering the front plate 11. On the side opposite to the side provided with the hinge 12 is positioned a latch means (not shown) for coupling the front plate 11 and the cover member 13 with each other.

Figure 2:
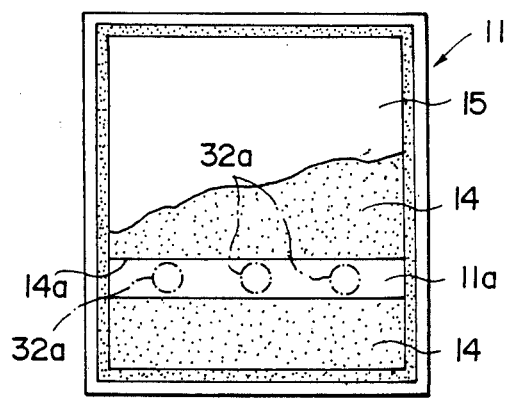
FIG. 2 is a partially cutaway plan view showing a part of the cassette of FIG. 1.

To the inner surface of the front plate 11 is secured a foamed material 14, e.g. a polyethylene material foamed to 20 times its original volume. As shown in FIG. 2, the foamed material 14 is provided with a notch 14a for exposing a part of an inner surface 11a of the front plate 11. Circles indicated by chain lines in FIG. 2 show the positions of sucking disks 32a of a suction arm for taking a stimulable phosphor sheet 15 out of the cassette 10. The suction arm will be described later.

The stimulable phosphor sheet 15 is housed in the front plate 11 so that a stimulable phosphor layer 15a of the sheet 15 contacts the foamed material 14 and a substrate 15b of the sheet 15 stands face to face with the cover member 13. To the inner surface of the cover member 13 is secured a sponge-like resilient layer 16 for resiliently pressing and holding the stimulable phosphor sheet 15.

The front plate 11 of the cassette 10 may be made of a metal or a hard plastic material permeable to a radiation. Openable coupling of the front plate 11 with the cover member 13 need not necessarily be effected by using a hinge. For example, the front plate 11 and the cover member 13 may be separably coupled by a latch or the like. Further, the resilient layer 16 need not be a sponge-like material. Instead, for example, a rigid plate material may be resiliently supported by a leaf spring or the like.

The stimulable phosphor sheet 15 comprises the substrate 15b and the stimulable phosphor layer 15a laid on the substrate 15b. The stimulable phosphor used may be a rare earth element activated strontium sulfide phosphor or a rare earth element activated lanthanum oxysulfide phosphor as described in U.S. Pat. No. 3,859,527, a rare earth element activated alkaline earth metal fluorohalide phosphor as described in U.S. Patent No. 4,236,078, Japanese Unexamined Patent Publication Nos. 55(1980)-12143, 55(1980)-12145, 55(1980)-84389, 56(1981)-2385, 56(1981)-2386 or 56(1981)-74175, a rare earth element activated lanthanum oxyhalide phosphor as described in Japanese Unexamined Patent Publication No. 55(1980)-12144, a copper and/or lead activated zinc sulfide phosphor or a rare earth element activated barium alminate phosphor or an alkaline earth metal silicate phosphor as disclosed in Japanese Unexamined Patent Publication No. 55(1980)-12142, or the like.

Figure 3:
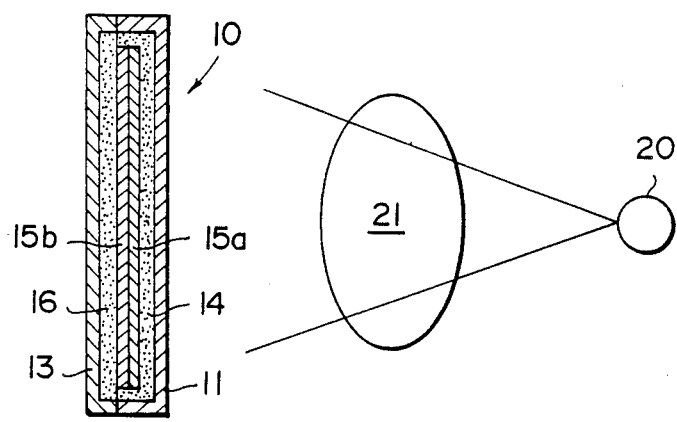
FIG. 3 is a schematic view showing the manner in which the cassette of FIG. 1 is used for recording a radiation image.

The cassette 10 constructed as described above is used as described below. As shown in FIG. 3, in the radiation image recording step, the cassette 10 is positioned at a point where it can be reached by a radiation such as X-rays emitted from a radiation source 20 after the radiation has passed through an object 21. In this condition, the cassette 10 is exposed to the radiation to have a radiation image of the object 21 stored in the stimulable phosphor layer 15a of the sheet 15 contained in the cassette 10.

Figure 4:
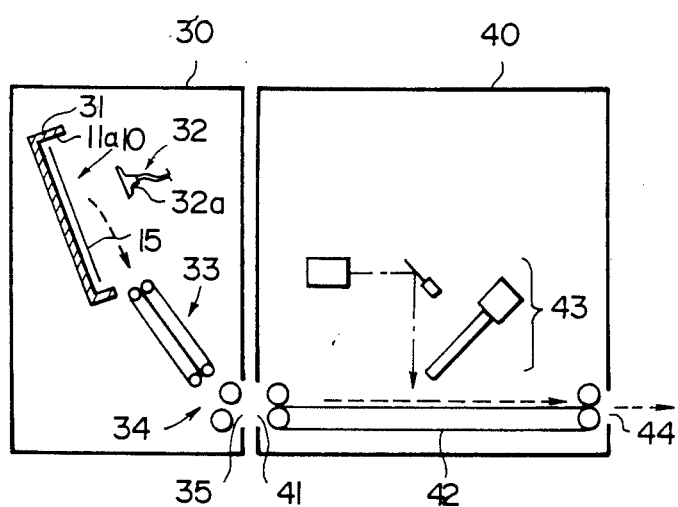
FIG. 4 is a schematic view showing the manner in which the cassette of FIG. 1 is used in the radiation image read-out step.

After the radiation image is stored in the sheet 15 as described above, the radiation image is read out by use of a radiation image read-out system as shown in FIG. 4. In FIG. 4, the cassette 10 containing the sheet 15 is loaded into a cassette loading section 31 of a cassette feeder 30, and the cover member of the cassette 10 is opened. Then, the sheet 15 contained in the front plate 11 of the cassette 10 is sucked by a suction arm 32 and taken out of the cassette 10. The suction arm 32 is moved to introduce the forward end of the sheet 15 (i.e. the lower end thereof in the drawing) between a pair of endless belts 33, and then air suction of the suction arm 32 is stopped. The sheet 15 is sent by the endless belts 33 to an outlet 35 via a pair of nip rollers 34, and ejected from the outlet 35. At the outside of the outlet 35 is positioned a sheet inlet 41 of a radiation image read-out apparatus 40. The sheet 15 ejected from the outlet 35 of the cassette feeder 30 is introduced from the sheet inlet 41 into the radiation image read-out apparatus 40, and placed on a horizontal conveying belt 42 in the apparatus 40. Above the horizontal conveying belt 42 is positioned an image read-out system 43 for scanning the sheet 15 with stimulating rays such as a laser beam which cause the sheet 15 to emit light having intensity in proportion to the radiation energy stored therein, and photoelectrically reading out the emitted light. While the sheet 15 is conveyed by the horizontal conveying belt 42, the radiation image stored in the sheet 15 is read out by the image read-out system 43. After the radiation image read-out is finished, the sheet 15 is ejected from a sheet outlet 44. Then, the radiation energy remaining in the sheet 15 ejected from the sheet outlet 44 is erased, and the sheet 15 is again housed in a cassette for use in recording of a radiation image.

As described above, in the cassette feeder 30, the sheet 15 is taken out of the cassette 10. At this time, the stimulable phosphor layer 15a of the sheet 15 would ordinarily rub against the inner surface 11a of the front plate 11 of the cassette 10. However, since the foamed material 14 is provided on the inner surface 11a of the front plate 11, the stimulable phosphor layer 15a rubs against the soft foamed material 14 instead. Therefore, there is no risk of the stimulable phosphor layer 15a being scratched. The above applies also when the sheet 15 is introduced into the cassette 10.

Further, since the foamed material 14 is provided with the notch 14a, the sheet 15 does not come in close contact with the foamed material 14 at the portion of the notch 14a, but instead air intervenes between the sheet 15 and the inner surface 11a of the front plate 11 at the portion of the notch 14a. Accordingly, when the sheet 15 is taken out of the cassette 10, the problem that the sheet 15 cannot be easily taken out due to close contact of the sheet 15 with the foamed material 14, which is secured to the inner surface 11a of the cassette front plate 11, over the entire surface of the sheet 15 does not arise. When the sheet 15 is separated even a little from the foamed material 14 secured to the front plate 11 of the cassette 10 at the time of taking-out of the sheet 15, air enters the separated portion between the sheet 15 and the foamed material 14, and thereafter the sheet 15 becomes easily separated from the foamed material 14. Accordingly, in the case where the sheet 15 is taken out by use of the above-described suction arm 32, the portion of the sheet 15 at which the sheet 15 is sucked by the suction arm 32 should preferably be readily separable from the foamed material 14. For this reason, the notch 14a of the foamed material 14 should preferably be positioned near the point standing face to face with the sucking disks 32a of the suction arm 32, as shown in FIG. 2.

Figure 5:
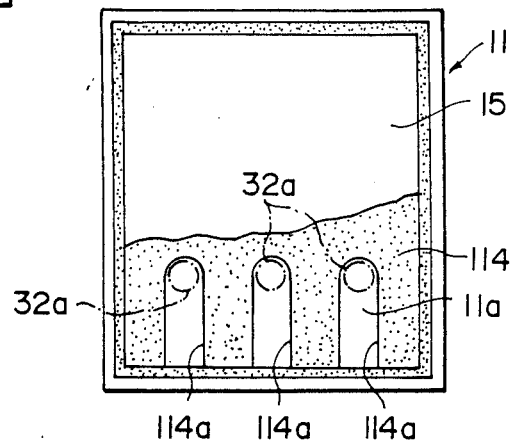
FIG. 5 is a partially cutaway plan view showing a part of another embodiment of the cassette in accordance with the present invention.

In the embodiment of FIG. 2, a single notch 14a is positioned near the point standing face to face with the sucking disks 32a of the suction arm 32 as described above. However, as shown in FIG. 5, as many notches 114a as the sucking disks 32a of the suction arm 32 may be formed in a foamed material 114 in positions corresponding to those sucking disks 32a. (In FIG. 5, similar elements are numbered with the same reference numerals with respect to FIGS. 1 and 2.) It is also possible to position many small notches over the entire surface of the foamed material so that the same effects as those of the above-described embodiments can be obtained even when various other sheet taking-out apparatuses, e.g. apparatuses utilizing a taking-out means other than the suction arm, or apparatuses utilizing sucking disks positioned in different numbers and at different intervals.

In the embodiments described above, the foamed material 14 or 114 is secured only to the front plate 11 of the cassette 10. However, in order to protect the substrate 15b of the sheet 15 or to protect the stimulable phosphor layer 15a when the sheet 15 is housed in the cassette 10 with the stimulable phosphor layer 15a facing the cover member side, it is possible to secure the foamed material also to the inner surface of the cover member 13.

We claim:

1. In an apparatus for removing a stimulable phosphor sheet from a cassette, said apparatus including sheet taking-out means for removing said stimulable phosphor sheet, said cassette comprising means for housing, exclusively, a single stimulable phosphor sheet for storing a radiation image therein, said cassette further comprising a foamed material positioned so as to surround said single stimulable phosphor sheet in said cassette, said foamed material being secured to an inner surface of a cassette front plate and having at least one notch for exposing a part of said inner surface of said cassette front plate, wherein said notch is positioned near a point at which said sheet taking-out means is positioned.

2. An apparatus as defined in claim 1 wherein a cover member is openable coupled with said front plate, and a resilient layer is secured to said inner surface of said cover member.

3. An apparatus as defined in claim 2 wherein said resilient layer is in the form of sponge.

4. An apparatus as defined in claim 1 wherein said foamed material is a foamed polyethylene material.

5. An apparatus as defined in claim 1 wherein said front plate is made of a material selected from the group consisting of a metal and a hard plastic material permeable to a radiation.

* * * * *